United States Patent
Camus et al.

(10) Patent No.: US 7,496,199 B2
(45) Date of Patent: Feb. 24, 2009

(54) METHOD OF CONTROLLING ACCESS TO CRYPTOGRAPHIC RESOURCES

(75) Inventors: Sylvie Camus, Palaiseau (FR); Laurent Frisch, Paris (FR); Dimitri Mouton, Paris (FR)

(73) Assignee: France Telecom, Paris (FR)

( * ) Notice: Subject to any disclaimer, the term of this patent is extended or adjusted under 35 U.S.C. 154(b) by 520 days.

(21) Appl. No.: 10/513,074

(22) PCT Filed: May 16, 2003

(86) PCT No.: PCT/FR03/01494

§ 371 (c)(1),
(2), (4) Date: Oct. 29, 2004

(87) PCT Pub. No.: WO03/098436

PCT Pub. Date: Nov. 27, 2003

(65) Prior Publication Data

US 2005/0169475 A1    Aug. 4, 2005

(30) Foreign Application Priority Data

May 21, 2002   (FR) .................................. 02 06160

(51) Int. Cl.
*H04K 1/00*    (2006.01)
*H04L 9/00*    (2006.01)
*G06F 1/00*    (2006.01)
*G06F 9/46*    (2006.01)

(52) U.S. Cl. ...................... 380/247; 380/277; 380/278; 380/280

(58) Field of Classification Search ................. 380/277
See application file for complete search history.

(56) References Cited

U.S. PATENT DOCUMENTS

| | | | | |
|---|---|---|---|---|
| 5,559,887 A | * | 9/1996 | Davis et al. | 705/68 |
| 5,689,565 A | * | 11/1997 | Spies et al. | 713/189 |
| 5,787,175 A | * | 7/1998 | Carter | 713/165 |
| 5,790,677 A | * | 8/1998 | Fox et al. | 705/78 |
| 5,913,024 A | * | 6/1999 | Green et al. | 726/3 |
| 5,966,448 A | * | 10/1999 | Namba et al. | 380/33 |
| 6,389,535 B1 | | 5/2002 | Thomlinson et al. | |

(Continued)

FOREIGN PATENT DOCUMENTS

WO    WO 01/35194 A2    5/2001

(Continued)

OTHER PUBLICATIONS

The Open Group, Technical Standard Common Security: CDSA and CSSM Version 2 (with Corrigenda), pp. 47-70.*

(Continued)

*Primary Examiner*—Emmanuel L Moise
*Assistant Examiner*—Courtney D Fields
(74) *Attorney, Agent, or Firm*—Drinker Biddle & Reath LLP

(57) ABSTRACT

The cryptographic resources are supplied by at least one cryptographic source having a specific access interface. The application is presented with a mutualized interface substantially independent of the cryptographic sources and of their respective access interfaces. A translation module is placed between the mutualized interface and each interface for accessing a cryptographic source to provide access to the cryptographic resources from the application via the mutualized interface.

19 Claims, 1 Drawing Sheet

U.S. PATENT DOCUMENTS

| | | | | |
|---|---|---|---|---|
| RE38,070 E | * | 4/2003 | Spies et al. | 380/277 |
| 6,681,327 B1 | * | 1/2004 | Jardin | 713/153 |
| 6,732,277 B1 | * | 5/2004 | Vandergeest et al. | 726/19 |
| 6,839,437 B1 | * | 1/2005 | Crane et al. | 380/286 |
| 7,110,548 B1 | * | 9/2006 | Ougi et al. | 380/278 |
| 7,149,510 B2 | * | 12/2006 | Hansson et al. | 455/418 |
| 7,167,985 B2 | * | 1/2007 | Ahmed | 713/176 |
| 7,181,017 B1 | * | 2/2007 | Nagel et al. | 380/282 |
| 2002/0056044 A1 | * | 5/2002 | Andersson | 713/189 |
| 2002/0143813 A1 | * | 10/2002 | Jellum et al. | 707/511 |
| 2002/0162021 A1 | * | 10/2002 | Audebert et al. | 713/201 |
| 2003/0079128 A2 | * | 4/2003 | Mullen et al. | 713/173 |
| 2004/0025022 A1 | * | 2/2004 | Yach et al. | 713/176 |
| 2004/0148429 A1 | * | 7/2004 | Audebert et al. | 709/238 |
| 2004/0215661 A1 | * | 10/2004 | Zhang et al. | 707/104.1 |

FOREIGN PATENT DOCUMENTS

| | | | |
|---|---|---|---|
| WO | WO0135194 A2 | * | 5/2001 |
| WO | WO 2006072692 A1 | * | 7/2006 |

OTHER PUBLICATIONS

Gian Pietro Picco, Gruia-Catalin Roman, Peter J. McCann, "Reasoning about code mobility with mobile UNITY", Jul. 2001, ACM Transactions on Software Engineering and Methodology (TOSEM), pp. 338-395.*

Emms, "A Definition of an Access Control Systems Language," *Computer Standards and Interfaces*, 6 (4), pp. 443-454, Elsevier Sequoia, Lausanne, Switzerland (1987).

* cited by examiner

METHOD OF CONTROLLING ACCESS TO CRYPTOGRAPHIC RESOURCES

CROSS-REFERENCE TO RELATED APPLICATIONS

This application is the U.S. national phase of the PCT/FR03/01494 filed May 16, 2003, which claims the benefit of French Application No. 0206160 filed May 21, 2002, the entire content of which is incorporated herein by reference.

BACKGROUND OF THE INVENTION

The present invention relates to the use of cryptographic techniques by computer applications.

It aims more particularly to offer application security services to various applications, written in a mobile code language (MCL for short) and running on various computer platforms. These application security services may require access to various types of cryptographic resources (CR for short) contained in varied cryptographic media. Thus the aim is to be able to mutualize these CRs between the applications through an architecture that is open and ready for the evolution of the techniques employed, particularly of the platforms, the cryptographic methods (algorithms, key sizes, etc.), the cryptographic media and standards, the application security services, the applications relying on these application security services, etc.

Amongst the applications in MCL covered by the invention, mention can be made for example of the tele-procedure, workflow, email and document publication applications.

By being written in a mobile code language, they can be independent of the platform on which they run. This language may for example be:

Java (see "The Java Language Specification" published by Sun Microsystems, Inc.);
CaML (see http://caml.inria.fr/);
C# (see "C# Language Specification" published by Microsoft Corporation); etc.

The expression "computer platform" refers to the hardware and software environments suitable for supporting the execution of applications in MCL. The platforms concerned are for example:

computers equipped with the "Windows" operating system from Microsoft Corporation (version 95/98/ME/NT/2000/XP) and an "Internet Explorer" browser from Microsoft Corporation or "Netscape Navigator" from Netscape Communications Corporation;
computers equipped with the MacOS 8/9/X operating system from Apple Computer, Inc. and an "Internet Explorer" or "Netscape Navigator" browser;
"Sun Solaris" platforms from Sun Microsystems, Inc. furnished with a "WebSphere" type server from International Business Machines Corporation; etc.

The application security services that are being offered to the applications are for example electronic signature, electronic signature verification, encryption, decryption timestamping, timestamp verification, secure protocol and authentication services. They use various types of CR such as cryptographic keys, certificates, algorithms allowing them to be used, etc.

The cryptographic media may be of the smart card type, a module able to be connected to a USB ("Universal Serial Bus") port called "USB token", a crypto-hardware card, a PCMCIA ("Personal Computer Memory Card International Association") card, a software store, etc.

There are numerous cryptographic standards concerning cryptographic algorithms, key generation, the format of messages of a cryptographic nature, secure protocols, etc.

The two most widely used signature algorithms with public key are RSA ("Rivest Shamir Adelman") and DSA ("Digital Signature Algorithm"). The RSA may also be used for encryption. The RSA is the subject of a standard known as PKCS#1 (Public Key Cryptography Standard No. 1') published by RSA Security, Inc. The, most used hashing algorithms are SHA-1 and MD5. The best known secret key algorithms are DES ("Digital Encryption Standard"), Triple DES, AES ("Advanced Encryption Standard"), IDEA ("International Data Encryption Algorithm"), RC4, KASUMI and MISTY.

The most widely used formats for signed messages are:

PKCS#7, published by RSA Security, Inc. and by the Internet Engineering Task Force (IETF) as RFC 2315, which has been adopted in CMS ("Cryptographic Message Syntax", see RFC 2630 of the IETF), these standards being used particularly in the S/MIME ("Secure Multipurpose Internet Mail Extensions") specification for signed emails;
PGP corresponding to the signed messages originating from the PGP ("Pretty Good Privacy" marketed by Networks Associates Technology, Inc.) software and its equivalents;
XML-DSig, forming part of the family of XML ("extended Markup Language") data formats.

The most widely used formats for encrypted messages are PKCS#7/CMS and PGP.

For access to cryptographic resources (CR), there are high level interfaces and low level interfaces. The high level interfaces, in particular PKCS#11 and CAPI, offer a level of abstraction relative to the medium of the cryptographic elements managed.

PKCS#11 is a public standard and free to use, published by RSA Security, Inc. It describes an application programming interface (API) allowing low level cryptographic operations such as the generation and storage of keys, the electronic signature, the encryption and decryption of data, etc. However, PKCS#11 does not mutualize the CRs between the different applications that make use of it. PKCS#11 does not manage the trust certificate chains. It cannot be invoked from mobile code languages. This interface is used particularly in "Netscape Navigator" in order to open the cryptographic functionalities of the navigator and of the messaging client to third party suppliers. This interface is also employed in most products that require this same openness. The majority of cryptographic hardware suppliers offer a PKCS#11 module for accessing their products.

CAPI ("Crypto API") is an API developed by Microsoft Corporation and available only on the "Windows" platforms. It offers application security functions and functions of signature verification and of management of trust certificate chains absent from PKCS#11. CAPI is not open-ended and cannot be used to add functions such as timestamping or new protocols. CAPI carries out mutualization of the CRs to which it has access between the applications which make use of it. But it cannot generally be invoked from the mobile code languages. A cryptographic module interfacing in CAPI in order to offer security services is called a CSP ("Crypto Service Provider"). To be usable via CAPI, the CSPs must be signed electronically by Microsoft Corporation which for this requires access to the sources of the CSP. The major suppliers of cryptographic hardware usually offer a CSP for accessing their product.

Other interfaces for accessing CRs exist at a lower programming level, that is to say offering less abstraction relative to the CRs managed.

Each hardware cryptographic medium possesses a set of basic instructions to which it can respond. These instructions, sent directly over the connectors of the medium, are used to perform the basic cryptographic operations. Usually these basic instructions are not public, or at least not documented.

The PC/SC ("Personal Computer/Smart Card") standard aims to offer a very low level of abstraction relative to these instructions, in order that communication between the workstation and the cryptographic medium (for example the smart card) is performed according to a set of instructions common to all the cryptographic media. Most of the CSPs and PKCS#11 modules rely, for their low interface, on PC/SC. Each cryptographic medium usually possesses a PC/SC driver which is invoked in the CSPs or in the PKCS#11 modules via the standard PC/SC interface and which is based on the aforementioned basic instructions. PC/SC provides mutualized access to certain CRs (smart cards, USB tokens) for the applications which are based on it. But it cannot generally be invoked in mobile code languages and it does not provide high level services.

Software cryptographic media, for their part, are usually stores of keys and of certificates contained in files that have a format that may or may not be documented. "Netscape Navigator" keeps the cryptographic keys and certificates in two files called cert7.db and key3.db whose format is stable even on changes of browser version. The known format of this file may be a sufficient interface for a service to be able to access these keys and certificates. An interface for access to these files exists on certain platforms, particularly NSS ("Netscape Security Services"). It involves proprietary formats.

Mobile code languages (MCL) are programming languages whose resultant code is not dependent on one microprocessor or on one operating system. To run, the program needs to find a similar execution environment on the various computers on which it is required to run.

The MCLs that are of primary interest are those that are used also to produce web applications. The most widely used is the Java language from Sun Microsystems, Inc. Java web applications running in a browser environment are called applets. Another MCL that has appeared more recently is the C# language from Microsoft Corporation. The example that will be more particularly considered in the present application is that of Java, but the concepts apply to any other MCL.

MCLs may propose cryptographic interfaces to the applications. In the Java example, the Java cryptographic architecture (JCA, "Java Cryptographic Architecture") and the Java cryptographic extension (JCE, "Java Cryptographic Extension") play this role in order to be able to manipulate certificates, keys, algorithms, etc. With Java version 2 the "Trusted API" also appeared which is used to manage trust by means of public key certificates.

An application in MCL may need to access functionalities that are not available in its execution environment. If these functionalities are available in dynamic library form dependent on the platform, the Java environments can be used to access these resources via specified but not unified interfaces:

JNI ("Java Native Interface" from Sun Microsystems, Inc.) applying to recent browsers;

JRI ("Java Runtime Interface" from Netscape Communications Corporation) applying to certain former versions of "Netscape Navigator" or on certain platforms;

RNI ("Raw Native Interface") from Microsoft Corporation) applying only in the "Internet Explorer" browser.

The techniques mentioned above form disparate bricks in the composition of secure web applications. Nothing is provided to make them work together.

For accessing CRs from a Java applet, the choices are very limited, even nonexistent. A Java applet cannot use the CRs of the browser in which it is running. Nor can it use CRs accessible via a PKCS#11 interface. As for the JCA/JCE resources, they are often poorly recognized (or not recognized at all) in the browsers. Additionally, these JCA/JCE resources, when they are recognized, cannot be mutualized between several applications. To be mutualizable, a resource must be accessible via a standard interface independent of the programming language and of the platform.

For the use of the cryptographic standards, the standard formats PKCS#7, PGP, and XML-DSig are not recognized in the MCLs.

The interfaces for accessing CRs are usually insufficient to fully provide the security services that are required by the applications that may call upon them.

Thus, PC/SC allows only calls to the functions available on the smart card, which are extremely limited (reading a certificate, having a key signed, usually). PKCS#11 allows the manipulation of more complex objects, but provides no function for verifying trust certificate chains, and does not include complex functions such as timestamping or calls to communication protocols. CAPI allows the verification of trust chains but handles neither the OCSP protocol ("Online Certificate Status Protocol", RFC 2560, IETF) nor timestamping (see RFC 3161, IETF).

In these conditions, each program requiring the call to these CRs must in itself implement the chaining logic of the elementary security bricks, which considerably increases the cost of development. Furthermore, it generates risks of security failure in the developed application.

In addition, the implementations of the various most widely used interfaces are still not identical from one manufacturer to another, which requires each application to be adapted to each CR supplier. For example, a service that operates with a USB token of supplier A will not be able to operate with that of supplier B if the implementations of the PKCS#11 interface produced by both of them differ.

The CRs are of different natures on the station, accessible via extremely varied interfaces. For reasons of complexity and cost, the applications usually implement only one type of interface, thus closing access to the other CRs.

It also frequently happens that an application itself supports an independent CR via a proprietary interface and that this resource is not accessible to the other applications.

Thus, in the current state of the art, the CRs are not all accessible to a given application and it may be that a CR is not accessible to all the applications.

SUMMARY OF THE INVENTION

One aim of the present invention is to overcome the above problems to a large extent.

Thus the invention proposes a method of controlling access to cryptographic resources from at least one computer application written in a mobile code language, the cryptographic resources being supplied by at least one cryptographic source having a specific access interface. The application is presented with a mutualized interface substantially independent of the cryptographic sources and of their respective access interfaces, and a translation module is placed between the mutualized interface and each interface for accessing a cryptographic source to provide the access to the cryptographic resources from the application via the mutualized interface.

Thus the method allows a program in MCL to access a set of CRs which may or may not be heterogeneous, via access interfaces which may or may not be identical. The program relies on a unique API type mutualized interface without consideration of the nature of the CRs, declared in the MCL, called "mutualization API". The instructions that this interface must allow are typically searches for cryptographic keys and certificates and the operations which request access to the private or secret keys stored in the CRs (for example: electronic signature, decryption with public key, encryption and decryption with secret key, generation of keys, etc.).

The operations not requiring access to the CRs are preferably performed directly in the MCL for reasons of performance without compromising security. Certain of these operations could however equally be performed via the access to the CRs.

The API is implemented by a translation software module, hereinafter called "bridge", the purpose of which is to allow the programs in MCL to communicate with a single implementation of the mutualization API.

The bridge is typically written in a language dependent on the platform running the program. It may be used simultaneously by several programs. The bridge relies on the set of interfaces accessing the CRs that it mutualizes for the mobile code applications. Thus, seen from the program (and even from all the programs using the bridge), the set of CRs will be accessible with a single source, that is the bridge, via a single interface, that is the mutualization API.

In the current example in which the MCL is Java, the mutualization API must comply with one of the Java interworking interfaces with the platform. Depending on the context, that may for example be JNI, JRI or RNI.

In the current case in which the platform is equipped with the "Windows" operating system (from versions 95 and NT4 onwards), the bridge may federate the CRs accessible via the CAPI interface, the CRs accessible via the PKCS#11 interface, the CRs accessible via the PC/SC interface, etc. When certain CRs are accessible via several interfaces, one manner of resolving the concurrent aspects duplicated by the bridge to these CRs is to process only one of these interfaces.

In the current case in which the program is an applet running in the virtual machine of an MCL in the browser, and wishes to access the CRs via the same interface as the browser, the bridge may make use of that interface only (for example CAPI if the browser is "Internet Explorer", PKCS#11 if it is "Netscape Navigator", etc.).

In an advantageous embodiment of the invention, the application written in MCL incorporates a modular architecture cryptographic toolbox comprising:
 a module for manipulating data formats used in the accomplishment of cryptographic functions;
 a module for executing algorithms involved in cryptographic operations;
 a module for accessing the cryptographic resources, interacting with the translation module via the mutualized interface; and
 a functional module supervising the data format manipulation, algorithm execution and cryptographic resource access modules, and having a functional interface (API) with the rest of the application.

This modular architecture of the application security services has numerous advantages for the developer of applications in MCL. It can thus be used to combine the cryptographic functions in a toolbox upon which the developer, who is not necessarily an expert in cryptography, may call according to his requirements while using the functional API.

Furthermore, this architecture lends itself quite easily to the evolutions of cryptographic technology. In order to take account of new data format standards, it will usually be sufficient to update simply the data format manipulation module. In order to take account of new cryptographic algorithms, it will usually be sufficient to update simply the algorithm execution module. In the event of changes to the mutualization API, it will usually be sufficient to update simply the module for accessing the cryptographic resources. Here again, these various changes may be made without having to be monitored by the developers of the programs in MCL. To take account of new security functions on the functional API, it will often be sufficient to update the functional module.

The aforementioned modules of the cryptographic toolbox may be supplemented by a utilities module that can be invoked by each of the other modules and given the task in particular of managing specific characteristics of the execution platform running the application. If changes of platform require updates of the application, the latter may usually, as concerns the cryptographic toolbox, be limited to this utilities module.

Another aspect of the present invention relates to a computer platform suitable for running applications written in MCL comprising at least one cryptographic source having a specific access interface, and a translation module, or bridge, in order to present to said applications a mutualized interface substantially independent of the cryptographic sources and of their respective access interfaces. The bridge is placed between the mutualized interface and each interface for accessing a cryptographic source in order to provide the access to the cryptographic resources from the applications via the mutualized interface.

A further aspect of the present invention relates to a translation software module suitable for constituting the bridge of such a computer platform.

DESCRIPTION OF PREFERRED
EMBODIMENTS

Figure 1:
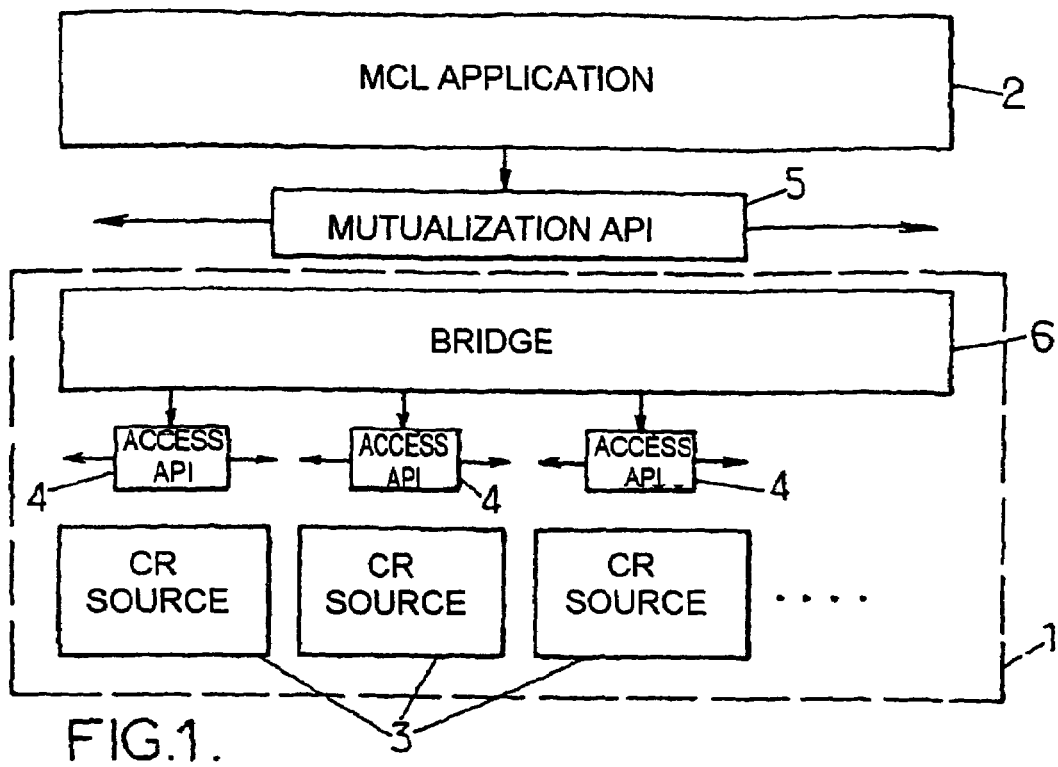
FIG. 1 is a block diagram of a computer platform suitable for running an application in MCL according to the invention.

With reference to FIG. 1, a system equipped in accordance with the invention comprises a computer platform 1 suitable for running applications 2 written in mobile code language (MCL). Various types of platforms and MCL, such as those mentioned above, may be employed. In the example illustrated by FIG. 1, the platform 1 is equipped with several sources 3 of cryptographic resources (CR) each having a specific API 4 for accessing the CRs. These APIs 4 may be of the same nature (for example PKCS#11, CAPI, PC/SC, etc.) or of different natures.

To interact with the security functions of applications 2 written in MCL, the platform 1 is provided with a mutualization API 5 implemented by a resident translation program 6 called a "bridge". This bridge 6 is placed between the mutualization API 5 and the APIs 4 for accessing the CR sources 3. If the program 2 runs within a browser, the mutualization API 5 must respect the interface format with this browser (JNI, JRI or RNI if the MCL is Java).

When the platform 1 is started up, or the first time it is invoked by a program 2, the bridge 6 sets up communication sessions with each of the CR sources 3 via their respective access interfaces 4. It then maintains these active sessions. It relays the instructions from the mutualization API 5 to the CR sources. These instructions are not addressed to one particular CR source, but to all these sources of which the bridge 6 supplies a general, abstract vision. The bridge retrieves the responses one by one from the CR sources and, depending on the context, relays them in return to the application 2 via the mutualization API 5.

Usually, an application 2 which needs cryptographic resources begins by transmitting over the API 5 a command to search for cryptographic identification data, these data typically taking the form of an X.509 certificate (see RFC 2459 published by the IETF). In response to this command received over the API 5, the bridge 6 interrogates each CR source 3. The certificates returned by the sources 3 over their access APIs 4 are analyzed by the bridge 6 which filters them in order to construct the response returned to the application via the mutualization API 5. Then, the application 2 addresses a cryptographic operation command to the bridge 6 via the mutualization interface 5, specifying the certificate corresponding to the CRs to which it is required to make a call, obtained in the response to the preceding search command. The bridge 6 then directs this cryptographic operation command to the CR source that supplied this certificate by carrying out the translations necessary to move from the mutualization API 5 to the corresponding access API 4. The result of the cryptographic operation returned by the CR source 3 will then be relayed by the bridge 6 to the application 2 via the mutualization API 5.

For example, if the program 2 has to carry out an encryption operation of the PKCS#1 type, it begins by questioning the bridge 6 so that it supplies the application with the corresponding certificates it has at its disposal. The bridge 6 obtains a list of certificates from the sources 3 and determines which of them match the request of the application and will be the only ones supplied to the application. The latter selects a certificate (if there are several) then requests execution of the encryption operation via the API 5 by supplying the message to be encrypted and the random number to employ. The bridge 6 relays this command to the appropriate source 3 then returns on the API 5 the response received on the API 4.

All this is done without the application 2 knowing the source 3 that will be operative nor even the nature of its access interface 4. It is therefore not necessary for the developer of the applications in MCL 2 to take account of the specifics of the different types of CR sources.

Figure 2:
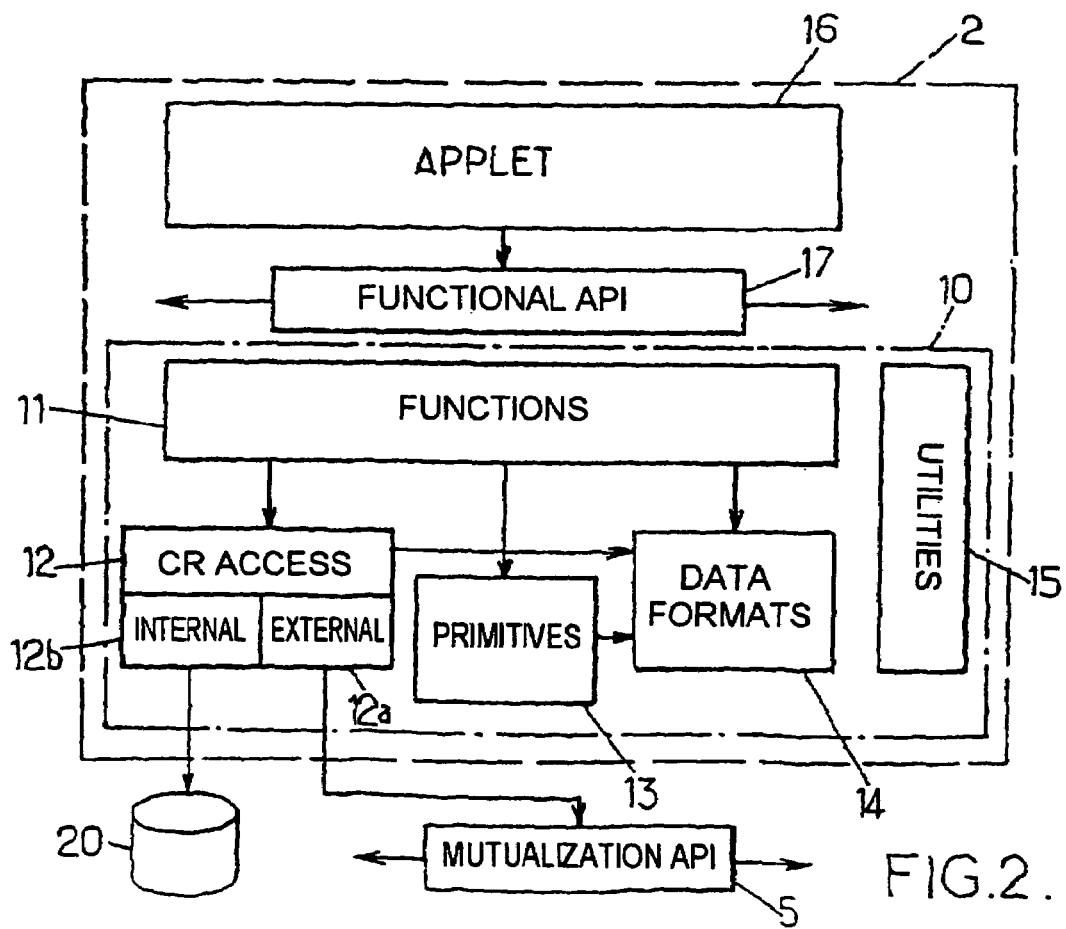
FIG. 2 is a block diagram of an application in MCL operating according to the invention.

FIG. 2 shows a preferred architecture of the security services in an application 2 written in MCL. In a known manner, these services are for example the electronic signature, the electronic signature verification, the encryption, the decryption, the timestamping, the timestamping verification, the instances of secure protocols, the authentication, etc.

These services are supplied within the application in MCL 2 by means of a cryptographic toolbox 10 whose software architecture is modular. It will be noted that the modules 11-15 are not necessarily compartmentalized for reasons of implementation volume.

The cryptographic toolbox 10 comprises:
a functional module 11;
a module 12 for accessing the cryptographic resources;
a primitives module 13; and
a data format manipulation module 14.

In FIG. 2 (as in FIG. 1), the orientation of the arrows indicates the direction in which the modules 11-14 are called.

A utilities module 15 preferably supplements these four modules 11-14. This utilities module 15 may be called by any one of the other modules 11-14 of the toolbox 10. The utilities module 15 is responsible for the following functionalities:
managing the differences between the platforms 1 and the specifications of the MCL and the specifics of the operating system used in these platforms;
manipulating the different possible forms of encoding (for example conversions between binary, Base64, PEM, etc.);
where appropriate, managing the logging, the self-installation of the toolbox 10, its updating, etc.

The data format manipulation module 14 allows the manipulation of data and cryptographic messages in standard formats such as for example PKCS#7/CMS, PGP, XML-DSig, X.509 certificates, X.509 revocation lists (CRL, "Certificate Revocation List"), OCSP, etc. by in particular being used for their encoding and their decoding. This module 14 is preferably standalone, that is to say that it does not need to make calls to the other modules 11-13.

For example, for the standards originating from the working group on the public key infrastructures of the IETF (PKIX) whose data formats are described in ASN.1 ("Abstract Syntax Notation No. 1"), the data format manipulation module will understand one or more ASN.1 encoders/decoders and the types described in PKIX.

The primitives module 13 includes:
cryptographic algorithms, particularly the hashing algorithms, random number generation algorithms, all the algorithms using public keys, etc.;
certificate and revocation management algorithms;
data types allowing the manipulation of the keys and certificates (containing these keys and certificates or containing a reference to these keys and certificates). For example, if a private key is contained in a smart card which it may not leave, the "key" type is used to have the operations requiring the use of that key carried out by the smart card and to retrieve the result of these operations.

It is desirable that the writing of the code of this primitives module 13 should depend only on the data format manipulation module 14 that it can invoke.

The module 12 is used for accessing CRs (for example keys or certificates) that may be of two types:
internal CRs, that is to say directly accessible in the MCL (for example: keys and certificates managed directly by the program 2). These resources can for example be read by the program on a local disk storage unit 20;
external CRs, that is to say accessible via the mutualization API 5 (for example: keys and certificates on a smart card or managed by a browser).

From the point of view of the functional module 11 that calls it, the module for accessing the CRs 12 is used to disregard the type of CR and the interface for accessing these CRs. Thanks to this, the program may manipulate the CRs without necessarily knowing their medium.

In the embodiment illustrated in FIG. 2, the CRs can be accessed either via the mutualization API 5 described with reference to FIG. 1, which is implemented by a submodule 12a of the module 12 (external CRs), or directly in the MCL by means of a submodule 12b of the module 12 (internal CRs). It should be noted that the submodule 12b for accessing the internal resources is optional.

Excluding the cryptographic toolbox 10, the rest of the program (applet 16 in the example illustrated in FIG. 2) is written in MCL by a developer who is not a specialist in cryptography. The functional module 11 presents to this applet 16 an interface 17 called "functional API" which performs the general security functions algorithm while relying on the modules 12-14. The security functions thus offered by the functional API are for example electronic signature, verification of electronic signature, encryption, decryption, timestamping, timestamping verification, secure protocols, authentication, etc.

Depending on the case, these functions may have parameters that are used to modify a standard behavior. For example, the electronic signature function allows the possibility of returning signed data in the PKCS#7 or XML-DSig formats. Another example: the signature verification function gives the possibility of checking or not checking the certification trust chain with or without revocation control.

As an illustration, the assumption hereinafter is the situation of a Java applet running in a "Netscape 4" browser in the "Windows" environment in order to produce one or more electronic signatures in PKCS#7 format. This embodiment corresponds to the need to use security functions based on a Java applet running in the Java virtual machine of "Netscape 4". These browsers support a limited version of version 1.1 of the Java platform specifications. In particular, they do not support the standard Java security functions.

The method of mutualizing access to the CRs from Java is then carried out by a bridge 6 which conforms with the JRI interface with the browser. The bridge federates one or more sources 3 conforming with the PKCS#11 type access interface of which it supplies a general, abstract vision. To access the software keys and certificates managed internally by "Netscape Navigator" and available in the form of files (called cert7.db and key3.db in the "Windows" operating systems), the CR source 3 corresponding to these files presents a PKCS#11 type access interface 4 dedicated to accessing these resources. The bridge 6 manages a PKCS#11 session with each CR source 3 in a manner transparent for the program 2. In this example, the application security functions are constructed according to the architecture in FIG. 2.

The data format manipulation module 14 implements the X.509 (certificates and CRL) and PKCS#7 (signed and/or encrypted messages format) standards. The primitives module 13 implements the hashing algorithms MD5 and SHA-1. The module 12 for accessing the CRs performs the access via the mutualization API 5 by interacting with the bridge 6. Finally, the functional module supplies in its functional API 17 the signature function, of which an exemplary interface in Java language is given below:

```
public class SignatureFunction
    // Initialization of the signature
public SignatureFunction (byte[ ] dataToSign) {..}
public SignatureFunction (byte[ ] dataToSign, boolean detached) {..}
public void setDetachedSignature (boolean detached) {..}
public void setSameCertificateAcceptance (boolean accept) {..}
// Signature iteration, in order to add a signature
// (allows cosignature)
public void setHashAlgorithm (String hashAlgorithm) {..}
public void setWithCertificateChain (boolean include) {..}
public void setWithAuthenticatedAttribute (boolean include) {..}
public void addAuthenticatedAttribute (..) {..}
public void setWithunauthenticatedAttribute (boolean include) {..}
public void addunauthenticatedAttribute (..) {..}
public void setHashAlgorithm (String hashAlgorithm) {..}
public void sign ( ) {..}
    // Selection of the certificate
public CertificateListFunction getCertificateLister ( ) {..}
public void setcertificateListFunction
        (UserCertificateListerFunction certLister) {..}
public CertificateSelector getCertificateSelector ( ) {..}
public setcertificateSelector (Certificateselector selector) {..}
// Parameter of the signature ergonomics
public setSignConfirmer (CertificateConfirmer confirmer) {..}
    // effective for PKCS#11 only:
```

-continued

```
public setReenterPINCode (boolean reenter) {..}
// Finalization
public ASN1Object getASN1Signature {..}
public byte[ ] getBinarySignature {..}
public String getBase64Signature {..}
public String getPEMSignature {..}
```

The applet 16 calls these security functions defined by the functional API 17. In most cases, the SignatureFunction, Sign and getPEMSignature functions may be sufficient to successively initialize, execute and retrieve the digital signature. The other functions are used to enrich the functional API 15 for the applets that require it.

It will be noted that many variants may be applied to the previously described exemplary embodiments.

For example, the bridge 6 may interact only with a single access interface 4, even to a single CR source 3, for example a single type of smart card.

The invention is not dependent on the operating system or the web browser employed. Neither does it depend on the type of interface between Java and the browser nor on the interface for accessing the CRs. It may in particular rely on RNI and CAPI in the case of an "Internet Explorer" browser from version 4 onwards.

For "Netscape 5" browsers, which support at least version 1.3 of the Java platform specifications, the method of mutualizing access to the CRs from Java is carried out by a bridge 6 which conforms with the JNI interface with the browser. The bridge federates one or more modules conforming with the access interface of the PKCS#11 type in the same manner as for the Netscape 4 browsers. However, the files containing the certificates and keys managed by Netscape 6 are situated in another location on the hard disk.

The invention is also applicable to standalone Java programs, that is to say independent of any browser. The invention is then used essentially in the same manner as in the case of the "Netscape 6" browser. The standalone applications, run in a Java virtual machine, make use of the functional API 17.

For applications on server, the bridge 6 and the toolbox 10 are similar to those that can be used with the "Netscape 6" browsers. However, the environment is not that of a browser, but of a "servlet" engine such a for example "Tomcat" from the Apache Software foundation, or "WebSphere". The Java programs that make use of the functional API 17 are servlets running in the Java virtual machine of the engine, and not applets.

The previously described examples in the case of Java can be transposed to any MCL supported, depending on the case, in the browsers, in the servlet engines, or in standalone applications. To benefit from the mutualization of the CRs, the MCL must be capable of accessing external software modules. This is particularly valid for variants of CaML and for C#.

The invention claimed is:

1. A method of providing access to cryptographic resources from at least one computer application running on a computer platform, the cryptographic resources being supplied by at least one cryptographic source having a specific access interface, the method comprising:

presenting the application written in a mobile code language with a mutualized interface independent of the computer platform, of the cryptographic sources and of the respective access interfaces thereof, and placing a translation module between the mutualized interface and each interface for accessing a cryptographic source to provide access to the cryptographic resources from the application via the mutualized interface.

2. The method as claimed in claim 1, comprising the step of activating and maintaining a communication session between the translation module and each cryptographic source via the respective access interface of said cryptographic source.

3. The method as claimed in claim 2, further comprising the following steps performed by the translation module in response to a search command received on the mutualized interface:
   interrogating each cryptographic source to obtain cryptographic identification data; and
   filtering said identification data to construct a response returned to the application via the mutualized interface.

4. The method as claimed in claim 3, wherein the response returned by the translation module via the mutualized interface comprises at least one cryptographic certificate corresponding to the search command.

5. The method as claimed in claim 3 wherein a cryptographic operation command addressed by the application to the translation module via the mutualized interface includes at least a portion of the identification data obtained in the response made to said search command, and the translation module directs said cryptographic operation command to the cryptographic source having supplied said identification data.

6. The method as claimed in claim 1, wherein the translation module is a resident program of an execution platform running the application in mobile code language.

7. The method as claimed in claim 1, wherein the application is furnished with a modular architecture cryptographic toolbox comprising:
   a module for manipulating data formats used in accomplishment of cryptographic functions;
   a module for executing algorithms involved in cryptographic operations;
   a module for accessing the cryptographic resources, interacting with the translation module via the mutualized interface; and
   a functional module supervising the data format manipulation, algorithm execution and cryptographic resource access modules, and having a functional interface with the rest of the application.

8. The method as claimed in claim 7, wherein the module for accessing the cryptographic resources comprises a sub-module for accessing resources directly accessible by the mobile code language of the application.

9. The method as claimed in claim 7 wherein the cryptographic toolbox further comprises a module of utilities that can be invoked by each of the other modules of said cryptographic toolbox.

10. A computer readable medium of instructions for the execution of applications written in a mobile code language, the computer readable medium of instructions comprising:
   at least one cryptographic source having a specific access interface and a translation module for presenting to said applications written in a mobile code language a mutualized interface independent of the computer platform, of the cryptographic sources and of the respective access interfaces thereof, the translation module being placed between the mutualized interface and each interface for accessing a cryptographic source to provide access to the cryptographic resources from the applications via the mutualized interface.

11. The computer readable medium of instructions as claimed in claim 10, wherein the translation module comprises means for activating and maintaining a communication session with each cryptographic source via the respective access interface thereof.

12. The computer readable medium of instructions as claimed in claim 11, wherein the translation module comprises means for interrogating each cryptographic source in response to a search command received from an application on the mutualized interface, in order to obtain cryptographic identification data, and means of filtering said identification data in order to construct a response returned to the application via the mutualized interface.

13. The computer readable medium of instructions as claimed in claim 12, wherein the response returned by the translation module via the mutualized interface comprises at least one cryptographic certificate corresponding to the search command.

14. The computer readable medium of instructions as claimed in claim 12 wherein the translation module comprises means for receiving a cryptographic operation command addressed by the application via the mutualized interface and including identification data obtained in the response made to said search command, and to direct said cryptographic operation command toward the cryptographic source having supplied said identification data.

15. A translation software module, embodied in a computer readable medium of instructions for execution in a computer platform suitable for the execution of applications written in a mobile code language and comprising at least one cryptographic source having a specific access interface, wherein said software module comprises, for presentation to said applications written in a mobile code language, a mutualized interface independent of the computer platform, of the cryptographic sources and of the respective access interfaces thereof, and wherein said software module is configured for placement between the mutualized interface and each interface for accessing a cryptographic source in order to provide the access to the cryptographic resources from the applications via the mutualized interface.

16. The software module as claimed in claim 15, comprising instructions for activating and maintaining a communication session with each cryptographic source via the respective access interface thereof.

17. The software module as claimed in claim 16, further comprising instructions for interrogating each cryptographic source in response to a search command received from an application on the mutualized interface, in order to obtain cryptographic identification data, and instructions for constructing a response returned to the application via the mutualized interface, by filtering of said identification data.

18. The software module as claimed in claim 17, wherein the response returned via the mutualized interface comprises at least one cryptographic certificate corresponding to the search command.

19. The software module as claimed in claim 17 further comprising instructions for receiving a cryptographic operation command addressed by the application via the mutualized interface and including identification data obtained in the response made to said search command, and for directing said cryptographic operation command to the cryptographic source having supplied said identification data.

* * * * *